(12) United States Patent
Singh et al.

(10) Patent No.: US 11,726,980 B2
(45) Date of Patent: Aug. 15, 2023

(54) AUTO DETECTION OF MATCHING FIELDS IN ENTITY RESOLUTION SYSTEMS

(71) Applicant: International Business Machines Corporation, Armonk, NY (US)

(72) Inventors: Neeraj Ramkrishna Singh, Bangalore (IN); Abhishek Seth, Deoband (IN); Soma Shekar Naganna, Bangalore (IN); Shettigar Parkala Srinivas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 16/928,361

(22) Filed: Jul. 14, 2020

(65) Prior Publication Data

US 2022/0019571 A1  Jan. 20, 2022

(51) Int. Cl.
*G06F 16/23* (2019.01)
*G06F 16/28* (2019.01)

(52) U.S. Cl.
CPC ........ *G06F 16/2365* (2019.01); *G06F 16/288* (2019.01)

(58) Field of Classification Search
CPC ............................ G06F 16/2365; G06F 16/288
See application file for complete search history.

(56) References Cited

U.S. PATENT DOCUMENTS

| | | | |
|---|---|---|---|
| 7,672,833 B2 | 3/2010 | Blume | |
| 7,725,475 B1 * | 5/2010 | Alspector | G06N 5/02 707/758 |
| 8,498,998 B2 | 7/2013 | Eshwar | |

(Continued)

FOREIGN PATENT DOCUMENTS

| | | |
|---|---|---|
| CN | 105740465 A | 7/2016 |
| CN | 108334315 A | 7/2018 |
| WO | 2022012536 A1 | 1/2022 |

OTHER PUBLICATIONS

Schwenk H, Bengio Y. Training methods for adaptive boosting of neural networks for character recognition. InProceedings of NIPS 1998 (vol. 98). (Year: 1998).*

Weis, Melanie, et al. "Industry-scale duplicate detection." Proceedings of the VLDB Endowment 1.2 (2008): 1253-1264. (Year: 2008).*

Li BH, Liu Y, Zhang AM, Wang WH, Wan S. A survey on blocking technology of entity resolution. Journal of Computer Science and Technology. Jul. 2020;35:769-93. (Year: 2020).*

(Continued)

*Primary Examiner* — Mohsen Almani
(74) *Attorney, Agent, or Firm* — Aaron Pontikos

(57) ABSTRACT

Methods, computer program products and/or systems are provided that perform the following operations: obtaining payload attribute fields; determining potential matching fields from the payload attribute fields; determining a matching function for each of the potential matching fields; determining an attribute score for each of the potential matching fields based on the matching function; obtaining a score list for a reference data set; determining a correlation of the attribute score for each of the potential matching fields with the reference data set score list; selecting new matching fields from the potential matching fields based at least in part on the correlation; determining an optimal weight for each of the selected new matching fields; selecting attribute fields for matching from the selected new matching fields based on a threshold rate for false positives and false negatives; and providing the attribute fields for matching and the associated optimal weight for the attribute fields.

18 Claims, 5 Drawing Sheets

(56) References Cited

U.S. PATENT DOCUMENTS

| | | | | |
|---|---|---|---|---|
| 8,577,814 | B1* | 11/2013 | Wu | G06N 3/126 |
| | | | | 706/12 |
| 9,881,053 | B2* | 1/2018 | Stoica-Beck | G06F 16/248 |
| 10,198,499 | B1* | 2/2019 | McNair | G16H 15/00 |
| 10,200,397 | B2* | 2/2019 | Dhar | G06F 16/3334 |
| 2012/0278263 | A1* | 11/2012 | Borthwick | G06N 5/025 |
| | | | | 706/12 |
| 2013/0054598 | A1* | 2/2013 | Caceres | G06F 16/215 |
| | | | | 707/E17.046 |
| 2017/0193039 | A1 | 7/2017 | Agrawal | |
| 2019/0303371 | A1* | 10/2019 | Rowe | G06F 16/24564 |
| 2019/0361971 | A1 | 11/2019 | Zenger | |
| 2020/0045016 | A1 | 2/2020 | Chor | |
| 2020/0074472 | A1* | 3/2020 | Adjaoute | G06N 20/20 |
| 2020/0364243 | A1* | 11/2020 | Tamayo-Rios | G06F 16/285 |
| 2021/0073662 | A1* | 3/2021 | Lokhande | G06N 5/04 |

OTHER PUBLICATIONS

"System and method to improve the performance of the candidate list generation process of an Entity Analytics system using in-memory, read-only cache", An IP.com Prior Art Database Technical Disclosure, Authors et al.: Disclosed Anonymously, IP.com No. IPCOM000212210D, IP.com Electronic Publication Date: Nov. 4, 2011, 20 pages.

Canalle et al., "A Strategy for Selecting Relevant Attributes for Entity Resolution in Data Integration Systems", In Proceedings of the 19th International Conference on Enterprise Information Systems (ICEIS 2017)—vol. 1, pp. 80-88 ISBN: 978-989-758-247-9, 9 pages, DOI: 10.5220/0006316100800088.

Zhao, et al., "Auto-EM: End-to-end Fuzzy Entity-Matching using Pre-trained Deep Models and Transfer Learning", WWW '19, May 13-17, 2019, San Francisco, CA, USA, ©2019 IW3C2 (International World Wide Web Conference Committee), published under Creative Commons CC-BY 4.0 License, ACM ISBN 978-1-4503-6674-8/19/05, 12 pages, <https://doi.org/10.1145/3308558.3313578>.

"Auto Detection of Matching Fields in Entity Resolution Systems", Patent Cooperation Treaty Application No. CN2021/106023, filed on Jul. 13, 2021, 27 pages.

Patent Cooperation Treaty PCT , From the International Searching Authority, Notification of Transmittal of the International Search Report and Written Opinion of the International Searching Authority, or the Declaration, dated Oct. 20, 202, Applicant's or agent's file reference F21W9430, International application No. PCT/CN2021/106023, International filing date: Jul. 13, 2021(Jul. 13, 2021), 9 pages.

* cited by examiner

AUTO DETECTION OF MATCHING FIELDS IN ENTITY RESOLUTION SYSTEMS

BACKGROUND

The present disclosure relates generally to the field of master data management, and more particularly to identifying data matching fields/attributes for use in matching and linking data in entity resolution systems.

In general, master data management can be used to define and manage an organization's critical data. Master data management can provide processes for collecting, matching, consolidating, and distributing organizational data to allow for consistency, accuracy, and control of the use and maintenance of this data.

Entity resolution systems provide useful tools within master data management. Entity resolution systems allow for organizations to connect disparate data sources to provide an understanding of possible entity matches and non-obvious relationships within and across different datasets.

SUMMARY

According to an aspect of the present invention, there is a computer-implemented method, computer program product and/or system that performs the following operations (not necessarily in the following order): obtaining a plurality of payload attribute fields associated with payload data; determining one or more potential matching fields from the plurality of payload attribute fields; determining a matching function for each of the one or more potential matching fields; determining an attribute score for each of the one or more potential matching fields based at least in part on the matching function; obtaining a score list for a reference data set; determining a correlation of the attribute score for each of the potential matching fields with the reference data set score list; selecting one or more new matching fields from the one or more potential matching fields based at least in part on the correlation of the attribute score with the reference data set score list; selecting one or more attribute fields for matching for the payload data from the selected new matching fields; and providing the one or more attribute fields for matching for use in matching data in an entity resolution system.

DETAILED DESCRIPTION

Figure 1:
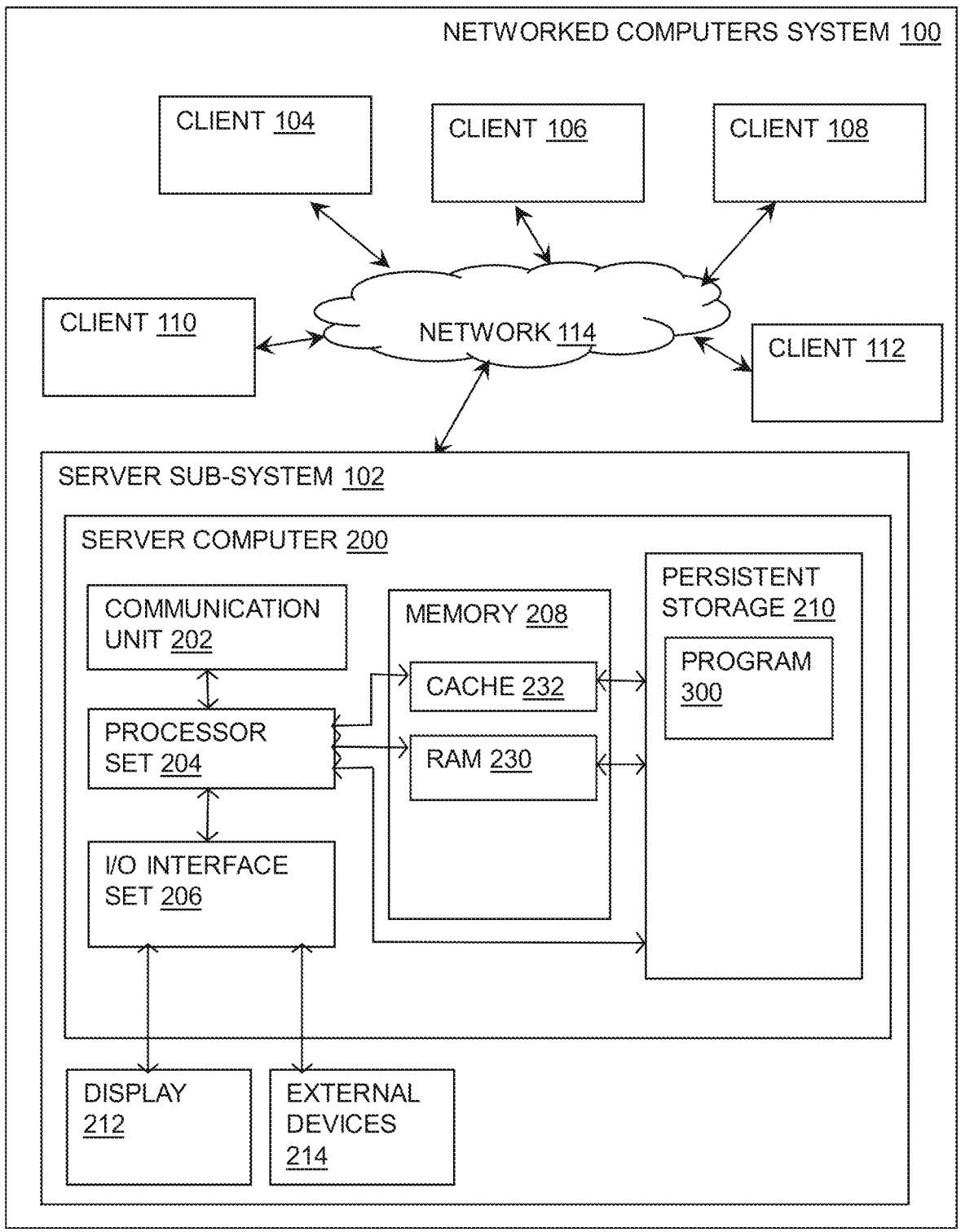
FIG. 1 is a block diagram view of a first embodiment of a system according to the present disclosure.

According to aspects of the present disclosure, systems and methods can be provided to allow for automatic detection and/or recommendation of new matching fields associated with payload data for use in matching and linking data in an entity resolution system. In particular, systems and methods of the present disclosure can provide for evaluating potential new matching fields/attributes from not-yet-matched payload data (e.g., payload fields/attributes) and judging the usefulness of the new matching fields, for example, by comparing to reference data and determining the impact on the number of false positives and/or false negatives.

In general, master data management can be used to define and manage an organization's critical data. Master data management can provide processes for collecting, matching, consolidating, and distributing organizational data to allow for consistency, accuracy, and control of the use and maintenance of this data. Entity resolution systems provide useful tools within master data management and can allow for organizations to connect disparate data sources to provide an understanding of possible entity matches and non-obvious relationships within and across different datasets. Entity resolution can allow for determining when references to real-world entities (e.g., within payload data records) refer to a same entity or refer to different entities.

Master data management solutions typically involve matching and linking data as a core capability. Finding a duplicate match in a given population generally would involve a significant number of comparisons (e.g., n2 comparisons), but with the use of bucketing in indexing, the number of comparisons can be limited to a chosen set of candidates.

However, even having good candidate selection criteria, there would generally be too many possibilities for choosing the actual fields for matching out of all available attributes within a payload data set (e.g., potentially hundreds of attributes). In general, a person implementing a system would make choices about the parts of the incoming record (e.g., list of attributes) that would form the basis for comparison (matching fields) during the initial phases of implementation. Key to making best quality matches and performance is the ability to choose the right set of fields for bucket indexes and matching. Typically, making such choices is reliant on a user's domain expertise and the system does not assist the user in selecting the right set of fields to perform the matching. The present disclosure provides for auto-identification of good matching fields from not-yet-matched-data (from payload attributes) using a feedback mechanism that makes use of comparison with known good matched pairs.

In some embodiments, following the initial deployment configuration in an entity resolution system is done, the system can evaluate payload data matching fields, for example, by comparing the current match results with a standard pre-defined reference result. The system can then perform optimization by evaluating additional potential matching fields and judging the usefulness of the potential matching fields by checking the impact each potential field has on the false positives and false negatives. The system can then automatically define or recommend one or more additional matching attribute filed to be used along with a corresponding weight for the matching attribute field and new scoring thresholds.

This Detailed Description section provides the following sub-sections: The Hardware and Software Environment; Example Embodiment(s); Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of exemplary networked computers system 100, which may include: server sub-system 102; client sub-systems 104, 106, 108, 110, 112; communication network 114; server computer 200; communication unit 202; processor set 204; input/output (I/O) interface set 206; memory device 208; persistent storage device 210;

display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section. As an example, a program 300 can comprise an attribute detector, a matching attribute recommender, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device(s) 208 and persistent storage device(s) 210 are computer-readable storage media. In general, memory device(s) 208 can include any suitable volatile or non-volatile computer-readable storage media. It is further noted that, now and/or in the near future: (i) external device set 214 may be able to supply, some or all, memory for sub-system 102; and/or (ii) devices external to sub-system 102 may be able to provide memory for sub-system 102.

Program 300 is stored in persistent storage device(s) 210 for access and/or execution by one or more of the respective computer processors in processor set 204, usually through one or more memories of memory device(s) 208. Persistent storage device(s) 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device(s) 210.

Program 300 may include both machine readable and performable instructions and/or substantive data (that is, the type of data stored in a database). For example, program 300 may include machine readable and performable instructions to provide for performance of method operations as further disclosed herein. In this particular embodiment, persistent storage device(s) 210 includes a magnetic hard disk drive. To name some possible variations, persistent storage device(s) 210 may include a solid state hard drive, a semi-conductor storage device, read-only memory (ROM), erasable programmable read-only memory (EPROM), flash memory, or any other computer-readable storage media that is capable of storing program instructions or digital information.

The media used by persistent storage device(s) 210 may also be removable. For example, a removable hard drive may be used for persistent storage device(s) 210. Other examples include optical and magnetic disks, thumb drives, and smart cards that are inserted into a drive for transfer onto another computer-readable storage medium that is also part of persistent storage device(s) 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device device(s) 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiment(s)

Figure 2:
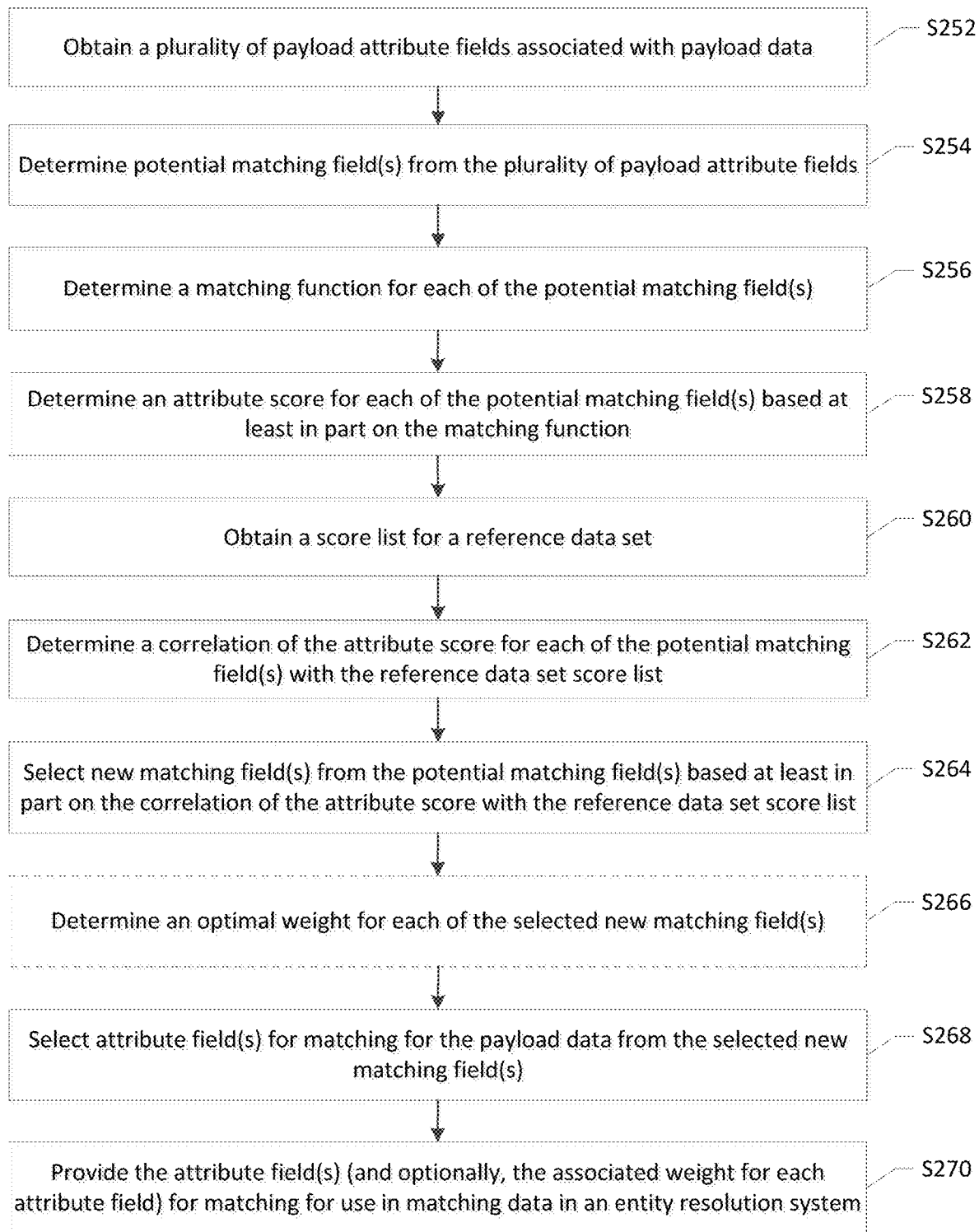
FIG. 2 is a flowchart showing a first embodiment method performed, at least in part, by the first embodiment system.
Figure 3:
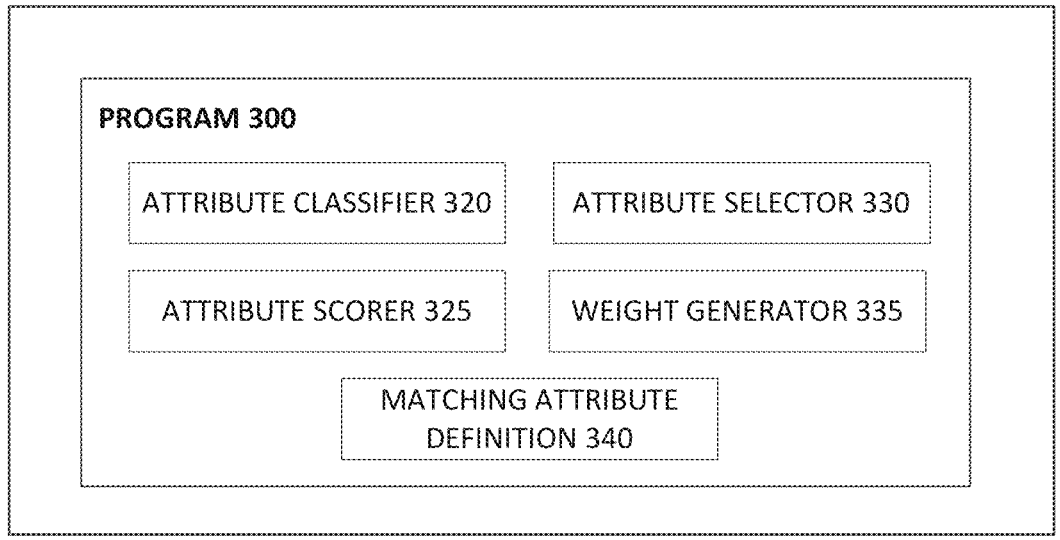
FIG. 3 is a block diagram showing a machine logic (for example, software) portion of the first embodiment system.

FIG. 2 shows flowchart 250 depicting a computer-implemented method according to the present invention. FIG. 3 shows program 300 for performing at least some of the method operations of flowchart 250. Regarding FIG. 2, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for auto-identification of new data matching fields begin at operation S252, where an attribute classifier module 320 or the like obtains a plurality of payload attribute fields associated with payload data that is to be processed in an entity resolution/master data management system. Processing proceeds to operation S254, where the attribute classifier module 320 can determine one or more potential matching fields from the plurality of payload attribute fields associated with the payload data.

Figure 5:
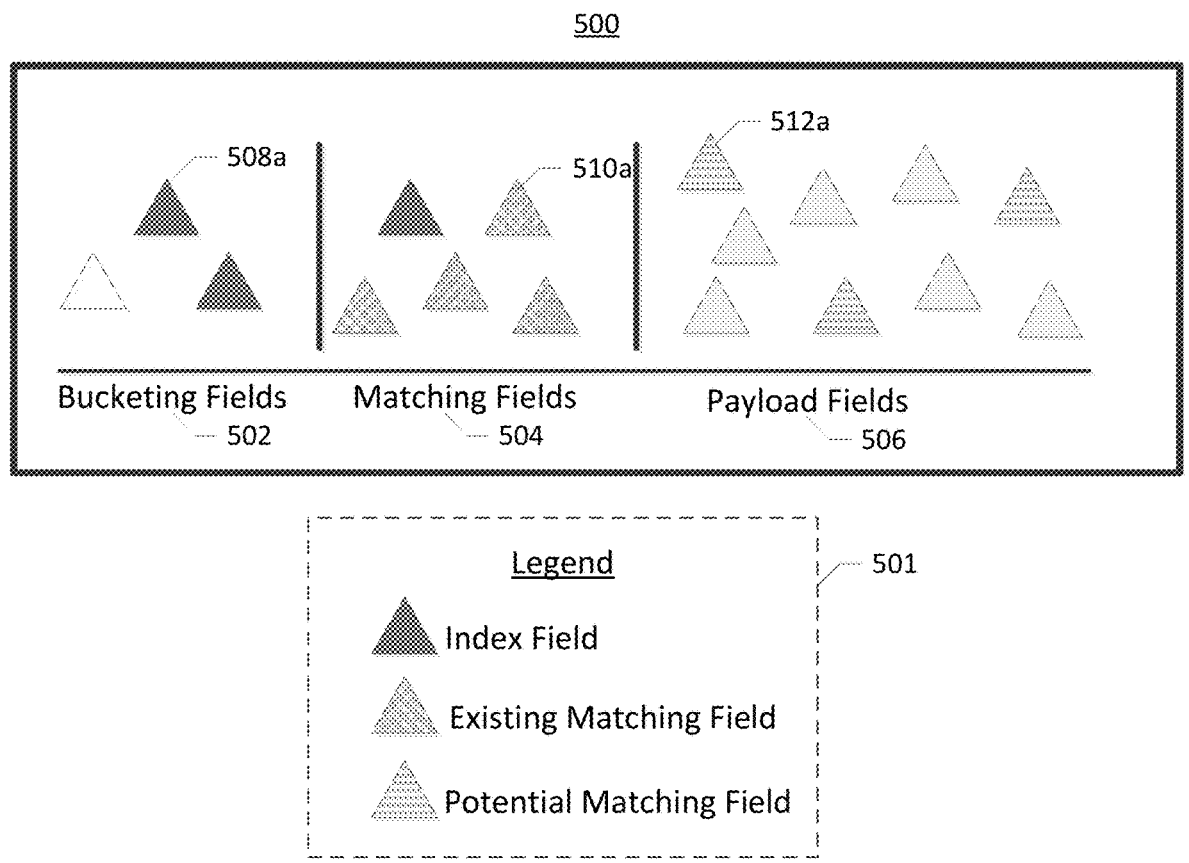
FIG. 5 illustrates example attributes of data records in accordance with embodiments of the present disclosure.

For example, as illustrated in FIG. 5, attributes of incoming payload data records 500 may be separated into three categories: bucketing fields 502, existing matching fields 504, and the remaining payload fields 506. In some embodiments, the bucketing fields 502 can include one or more index fields 508a and can be used to sort data records into buckets and/or index the records. The matching fields 504 can include one or more existing matching fields 510a which can be used for determining matching entities within the data records. The remaining payload fields 506 can include one or more new potential matching fields 512a which can be evaluated by the system to define and/or recommend new matching fields to be used in the entity resolution system. Legend 501 of FIG. 5 provides an indication of which types of attributes are within the payload data, such as, index fields 508a, existing matching fields 510a, and potential matching fields 512a.

In some embodiments, the attribute classifier module 320 can determine a class of data for each of the payload attribute fields and base the determination of potential matching fields in part on the class of data for the attribute. In some embodiments, the determination of potential matching fields may be based on whether the attribute comprises transactional information (e.g., information that is descriptive of an individual transaction, not an entity).

Processing proceeds to operation S256, where an attribute scorer module 325 or the like determines a suitable matching/comparison function for the potential matching field. For example, matching/comparison functions may include an exact match of the attribute field, a match of a partial string in the attribute field, a match of certain characters in the attribute field, and/or the like. Processing proceeds to operation S258, where the attribute scorer module 325 or the like calculates a score for the potential matching field based on the chosen matching/comparison function. In some embodiments, the attribute scorer module 325 may determine a match scoring threshold to be used for potential matching field comparison and/or an initial weight to be applied for the potential matching field.

Processing proceeds to operation S260, where the attribute scorer module 325 or the like obtains a score list for a reference data set. In some embodiments, the score list for the reference data set can provide expected matching outcomes and associated rates of false positives and false negatives. At operation S262, the attribute scorer module 325 or the like determines a correlation of the attribute score for the potential matching field with the reference data set score list. For example, the attribute scorer module 325 can provide a feedback mechanism that makes use of comparison of results for the potential matching field with known good matched pairs in the reference set result.

Processing proceeds to operation S264, where an attribute selector module 330 or the like selects one or more new matching fields from the potential matching field(s) based at least in part on the correlation of the attribute score with the reference data set score list. For example, in some embodiments, the attribute selector module 330 or the like may sort the potential matching fields based on a decreasing order of correlation and select a defined number of top entries as new matching fields. In some embodiments, the attribute selector module 330, the attribute scorer module 325, or the like may update a matching threshold to account for increases in overall scoring based on inclusion of additional matching fields.

In some embodiments, processing optionally proceeds to operation S266, where a weight generator module 335 or the like can determine an optimal weight for each of the selected new matching fields. For example, in some embodiments, the system can determine an optimal weight (e.g., adjusted from an initial weight for a payload attribute) to be used in scoring a new matching field based on an optimal rate of false positives and/or false negatives achieved when using the new matching field in a matching process on reference data or the like.

Processing proceeds to operation S268, where a matching attribute definition module 340 or the like selects one or more new attribute fields for matching for the payload data from the selected new matching fields. In some embodiments, for example, the one or more new attribute fields for matching for the payload are selected based at least in part on a threshold rate for false positives and/or false negatives. At operation S270, the matching attribute definition module 340 or the like defines and/or provides the one or more new attribute fields for matching and, optionally, the associated optimal weight for the new attribute fields for use in matching data in an entity resolution system.

Figure 4:
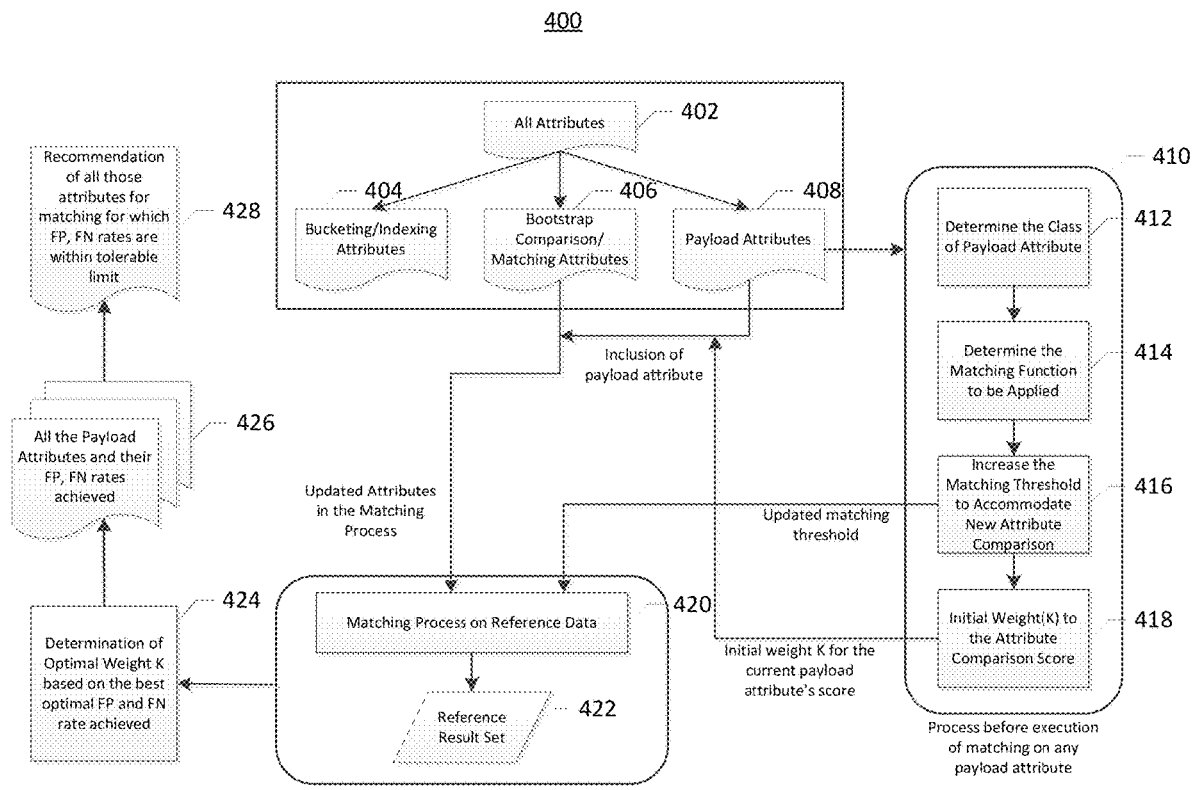
FIG. 4 is a functional block diagram illustrating another example embodiment capable of performing the methods according to the present disclosure.

FIG. 4 illustrates a functional block diagram 400 of another example embodiment capable of performing the methods according to the present disclosure. As illustrated in FIG. 4, the attributes 402 associated with data to be processed by an entity resolution system may be grouped into bucketing/indexing attributes 404, bootstrap comparison/matching attributes 406, and remaining payload attributes 408. The system may then process the payload attributes 408 to determine potential new matching attributes that can be used by the entity resolution system, for example, as illustrated by pre-matching process 410.

Pre-matching process 410 may begin with determining a data class 412 for each of the payload attributes 408. The system may then determine a suitable matching function 414 to be applied with the payload attribute(s) 408. The system may increase a matching threshold 416 to accommodate inclusion of new attributes in the matching process. The system may further determine an initial weight 418 to be used for scoring with the payload attribute 408.

The processed payload attributes 408, the updated matching threshold 416, and the initial weight 418 for the payload attribute score may then be provided, along with the bootstrap comparison/matching attributes 406, such that a matching process 420 can be performed using reference data set(s).

The updated attributes for matching may be used to match records in a reference data set and provide for determining a rate of false positives and/or false negatives. Based, at least in part, on the matching results 422 and the rate of false positives and/or false negatives, the system may determine an optimal weight 424 based on an optimal rate of false positives/false negatives that can be achieved for each of the potential new matching attributes (e.g., payload attributes). The payload attributes along with their respective rates of false positives and/or false negatives can be analyzed 426 by the system. The system can then define and/or recommend one or more payload attributes 428 to be used as new matching attributes, for example, based on which payload attributes achieve false positive/false negative rates that are within a defined threshold or limit. These new matching attributes may then be used in an entity resolution system to process payload data, for example, to provide data matching and linking functions.

Further Comments and/or Embodiments

Some embodiments of the present invention may provide for adjusting a matching threshold to be used when analyzing scoring for new potential matching attributes. For example, as new matching fields are added, the overall score may increase, and matching thresholds may be adjusted to account for higher scores and avoid too many false positives during a matching process. In some embodiments, match threshold adjustment may begin with determining a score range for the matching function selected for a payload attribute (potential matching field), for example, a score range of 0 to N. The current threshold for matching may then be updated based on a factor of the score range (e.g., 0.9, 0.8, 0.7, 0.6, etc.). For example, the current threshold may be adjusted by a factor of 0.8N, such that the updated threshold for matching $T_{NEW} = T_{OLD} + 0.8N$.

Some embodiments of the present invention may provide for determining an optimal weight for each potential new matching field, for example, for use in adjusting the matching score for the new matching field. In some embodiments, an initial weight (K) for a potential matching field may be determined before the potential matching field is used in a matching process (e.g., initial weight K=1). The initial weight K may be used in determining a match score for the potential matching field using a reference data set and a total number of false positives and/or false negatives using the matching field may be determined. In response to there being too many false positives/false negatives in the matching process, the initial weight may be adjusted by a defined amount. In an example, in response to too many false positives, the weight K may be reduced. For example, in some embodiments, the weight K may be reduced in steps of 0.1 when determining the optimal weight. The scoring process for the matching field using the reference data set may then be repeated and the weight K may be further adjusted in the case of too many false positives and/or false negatives. This process of adjusting the weight K and repeating the scoring process may be repeatedly iterated until an optimal combination of false positives/false negatives is achieved. In response to achieving an optimal combination of false positives/false negatives, the final adjusted weight may be set as the optimal weight for the matching field (e.g., acceptable rate of false positives and/or false negatives). This optimal weight may then be used in refining the overall score for a matching field, for example, the overall score S may be equal to the old score $S_0$ plus the weighted value of the new score $S_1$ ($S = S_0 + K \cdot S_1$).

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   prior to undergoing matching of any data among future payload data in an entity resolution system:
   determining a potential new attribute field for use in matching data among the future payload data in the entity resolution system;
   determining a matching function for the potential new attribute field, wherein the matching function corresponds to particular match criteria associated with the potential new attribute field;
   obtaining a score list for a reference data set that is distinct from the future payload data, wherein the score list for the reference data set includes expected matching outcomes and associated rates of false positives and false negatives when using the potential new attribute field in a matching process of known matched pairs in the reference data set;

determining a correlation of an attribute score for the potential new attribute field with the score list for the reference data set; and selecting the potential new attribute field for use in matching the future payload data in the entity resolution system based, at least in part, on the correlation of the attribute score with the score list for the reference data set.

2. The computer-implemented method of claim 1, wherein determining the potential new attribute field from the plurality of payload attribute fields for use in matching future payload data is based, at least in part, on a data class of the potential new attribute field.

3. The computer-implemented method of claim 1, wherein selecting the potential new attribute field comprises sorting the potential new attribute field among other previously selected potential new attribute fields based on a decreasing order of correlation and selecting a defined number of top entries as new attribute fields for use in matching future payload data.

4. The computer-implemented method of claim 1, further comprising determining an optimal weight for the selected new attribute field for use in matching future payload data, wherein determining the optimal weight for the selected new potential attribute field comprises:

determining an initial weight for the selected new potential attribute field;

performing a scoring process for the selected new potential attribute field based on the reference data set and the initial weight for the selected new potential attribute field;

determining a total number of false positives and false negatives for the reference data set using the selected new potential attribute field;

determining a new weight for the selected new potential attribute field based on a rate of false positives and false negatives;

repeating scoring and weight adjustment for the selected new potential attribute field until an acceptable rate of false positives and false negatives is achieved; and determining a final adjusted weight as the optimal weight for the selected new potential attribute field.

5. The computer-implemented method of claim 1, wherein selection of the potential new attribute field for use in matching future payload data is based, at least in part, on a threshold rate for false positives and false negatives.

6. The computer-implemented method of claim 1 further comprising:

determining a score range for a matching function associated with the potential new attribute field;

determining an updated threshold for matching by adjusting a current threshold for matching based on a factor of the score range; and providing the updated threshold for matching for use in selecting the potential new matching field, wherein the updated threshold adjusts for increases in overall scoring based on inclusion of an additional matching field.

7. A computer program product comprising a computer readable storage medium having stored thereon:

prior to undergoing matching of any data among future payload data in an entity resolution system:

program instructions programmed to determine a potential new attribute field for use in matching data among the future payload data in the entity resolution system;

program instructions programmed to determine a matching function for the potential new attribute field, wherein the matching function corresponds to particular match criteria of associated with the potential new attribute field;

program instructions programmed to obtain a score list for a reference data set that is distinct from the future payload data, wherein the score list for the reference data set includes expected matching outcomes and associated rates of false positives and false negatives when using the additional potential new attribute field in a matching process of known matched pairs in the reference data set;

program instructions programmed to determine a correlation of an attribute score for the potential new attribute field with the score list for the reference data set; and program instructions programmed to select the potential new attribute field for use in matching the future payload data in the entity resolution system based, at least in part, on the correlation of the attribute score with the score list for the reference data set.

8. The computer program product of claim 7, wherein determining the potential new attribute field from the plurality of payload attribute fields for use in matching future payload data is based, at least in part, on a data class of the potential new attribute field.

9. The computer program product of claim 7, wherein selecting the potential new attribute field comprises sorting the potential new attribute field among other previously selected potential new attribute fields based on a decreasing order of correlation and selecting a defined number of top entries as new attribute fields for use in matching future payload data.

10. The computer program product of claim 7, wherein the computer readable storage medium has further stored thereon:

program instructions programmed to determine an initial weight for the selected new potential attribute field;

program instructions programmed to perform a scoring process for the selected new potential attribute field based on the reference data set and the initial weight for the selected new potential attribute field;

program instructions programmed to determine a total number of false positives and false negatives for the reference data set using the selected new potential attribute field;

program instructions programmed to determine a new weight for the selected new potential attribute field based on a rate of false positives and false negatives;

program instructions programmed to repeat scoring and weight adjustment for the selected new potential attribute field until an acceptable rate of false positives and false negatives is achieved; and program instructions programmed to determine a final adjusted weight as the optimal weight for the selected new potential attribute field.

11. The computer program product of claim 7, wherein the computer readable storage medium has further stored thereon:

program instructions programmed to determine a score range for a matching function associated with the potential new attribute field;

program instructions programmed to determine an updated threshold for matching by adjusting a current threshold for matching based on a factor of the score range; and program instructions programmed to provide the updated threshold for matching for use in selecting potential new matching field, wherein the updated threshold accounts for increases in overall scoring based on inclusion of an additional matching field.

12. The computer program product of claim 7, wherein the selection of the potential new attribute field for use in matching future payload data is based, at least in part, on a threshold rate for false positives and false negatives.

13. A computer system comprising:
a processor(s) set; and
a computer readable storage medium;
wherein:
the processor set is structured, located, connected and/or programmed to run program instructions stored on the computer readable storage medium; and
the stored program instructions include, prior to undergoing matching of any data among a set of payload data in an entity resolution system:
program instructions programmed to determine a potential new attribute field for use in matching data among the set of payload data in the entity resolution system;
program instructions programmed to determine a matching function for the potential new attribute field, wherein the matching function corresponds to particular match criteria of associated with the potential new attribute field;
program instructions programmed to obtain a score list for a reference data set that is distinct from the payload data, wherein the score list for the reference data set includes expected matching outcomes and associated rates of false positives and false negatives when using the additional potential new attribute field in a matching process of known matched pairs in the reference data set;
program instructions programmed to determine a correlation of an attribute score for the potential new attribute field with the score list for the reference data set; and
program instructions programmed to select the potential new attribute field for use in matching the set of payload data in the entity resolution system based, at least in part, on the correlation of the attribute score with the score list for the reference data set.

14. The computer system of claim 13, wherein determining the potential new attribute field from the plurality of payload attribute fields for use in matching future payload data is based, at least in part, on a data class of the potential new attribute field.

15. The computer system of claim 13, wherein selecting the potential new attribute field comprises sorting the potential new attribute field among other previously selected potential new attribute fields based on a decreasing order of correlation and selecting a defined number of top entries as new attribute fields for use in matching future payload data.

16. The computer system of claim 13, wherein the stored program instructions further include:
program instructions programmed to determine an initial weight for the selected new potential attribute field;
program instructions programmed to perform a scoring process for the selected new potential attribute field based on the reference data set and the initial weight for the selected new potential attribute field;
program instructions programmed to determine a total number of false positives and false negatives for the reference data set using the selected new potential attribute field;
program instructions programmed to determine a new weight for the selected new potential attribute field based on a rate of false positives and false negatives;
program instructions programmed to repeat scoring and weight adjustment for the selected new potential attribute field until an acceptable rate of false positives and false negatives is achieved; and
program instructions programmed to determine a final adjusted weight as the optimal weight for the selected new potential attribute field.

17. The computer system of claim 13, wherein the stored program instructions further include:
program instructions programmed to determine a score range for a matching function associated with the potential new attribute field;
program instructions programmed to determine an updated threshold for matching by adjusting a current threshold for matching based on a factor of the score range; and
program instructions programmed to provide the updated threshold for matching for use in selecting the potential new matching field, wherein the updated threshold accounts for increases in overall scoring based on inclusion of an additional matching field.

18. The computer system of claim 13, wherein the selection of the potential new attribute field for use in matching future payload data is based, at least in part, on a threshold rate for false positives and false negatives.

* * * * *